United States Patent
Kudelko et al.

(10) Patent No.: US 6,712,410 B2
(45) Date of Patent: Mar. 30, 2004

(54) EXTRUDED ALUMINUM BUMPER

(75) Inventors: Conrad Michael Kudelko, Livonia, MI (US); Gregory Allen Kaepp, Dearborn, MI (US); Peter John Schuster, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,334

(22) Filed: Aug. 21, 2001

(65) Prior Publication Data
US 2003/0038488 A1 Feb. 27, 2003

(51) Int. Cl.[7] .............................................. B60K 19/02
(52) U.S. Cl. ..................... 293/102; 293/107; 293/117; 293/120
(58) Field of Search ................ 293/106, 102, 293/110, 109, 108, 120, 117, 121

(56) References Cited

U.S. PATENT DOCUMENTS

| | | | |
|---|---|---|---|
| 1,771,319 A | | 7/1930 | Schmidt |
| 2,221,721 A | | 11/1940 | Reger |
| 3,922,014 A | | 11/1975 | Hinderks |
| 3,997,207 A | * | 12/1976 | Norlin ........................ 293/110 |
| 4,424,996 A | * | 1/1984 | Yoshiyuki ................... 293/117 |
| 4,758,034 A | * | 7/1988 | Ghezzi et al. .............. 293/132 |
| 4,782,738 A | | 11/1988 | Jackson et al. |
| 4,939,828 A | | 7/1990 | Maier |
| 5,219,197 A | * | 6/1993 | Rich et al. .................. 293/121 |
| 5,340,178 A | * | 8/1994 | Stewart et al. ............. 293/122 |
| 5,365,650 A | | 11/1994 | Smith et al. |
| 5,407,239 A | | 4/1995 | Arai et al. |
| 5,984,389 A | * | 11/1999 | Nuber et al. ................ 293/109 |
| 5,988,713 A | * | 11/1999 | Okamura et al. ........... 293/120 |
| 6,000,738 A | | 12/1999 | Stewart et al. |
| 6,099,055 A | * | 8/2000 | Hirota et al. ............... 293/120 |
| 6,113,164 A | | 9/2000 | Setina |
| 6,405,819 B1 | * | 6/2002 | Ohkura et al. ............. 180/68.1 |

FOREIGN PATENT DOCUMENTS

| | | | | |
|---|---|---|---|---|
| JP | 0102746 A | * | 8/1980 | ................. 293/120 |
| JP | 4-59147 A | | 2/1992 | |
| JP | 406305378 A | * | 11/1994 | ................. 293/108 |

OTHER PUBLICATIONS

"Extrusion", Plastics Handbook, edited by the staff of Modern Plastics magazine, 1994, McGraw–Hill, Inc., pp. 152–158.*

* cited by examiner

Primary Examiner—Jason Morrow
(74) Attorney, Agent, or Firm—Gigette Bejin

(57) ABSTRACT

An extruded bumper for a vehicle includes a top face, a bottom face generally opposing the top face, a front face, and a rear face generally opposing the front face. A bumper interior cavity is generally bounded by and defined between the top face, the bottom face, the front face, and the rear face. The bumper interior cavity has at least one partition located therein which is aligned in a longitudinal plane defined by a vehicle rail. The bumper can be extruded along either the x-axis or the z-axis.

14 Claims, 6 Drawing Sheets

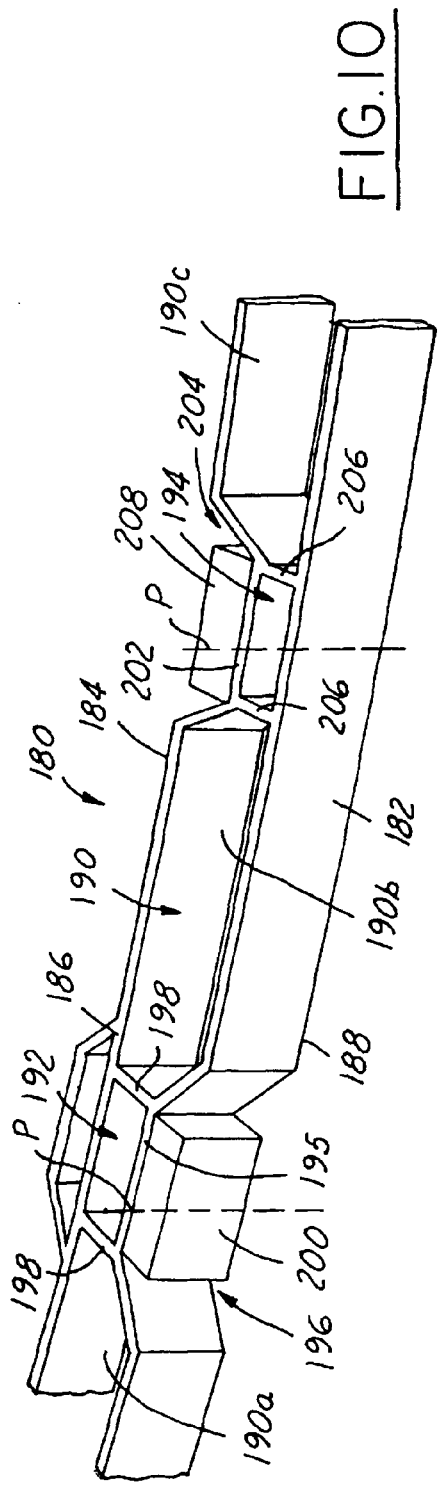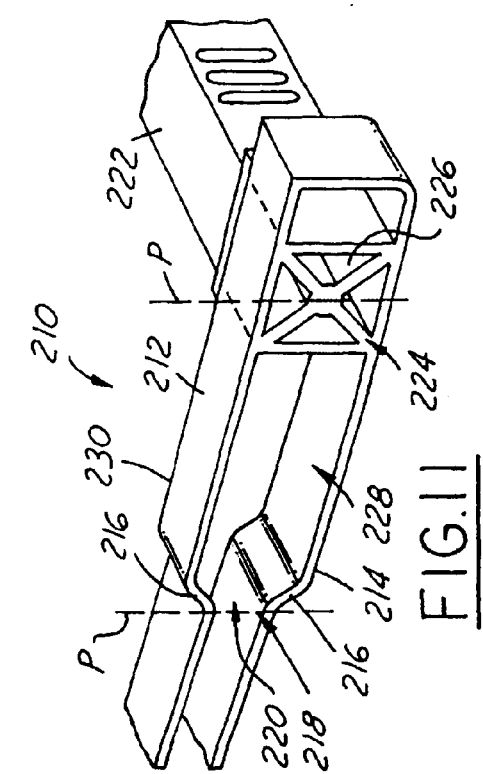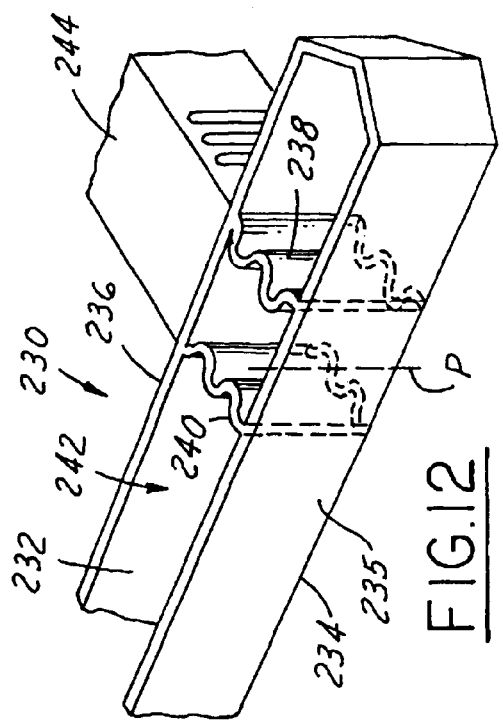

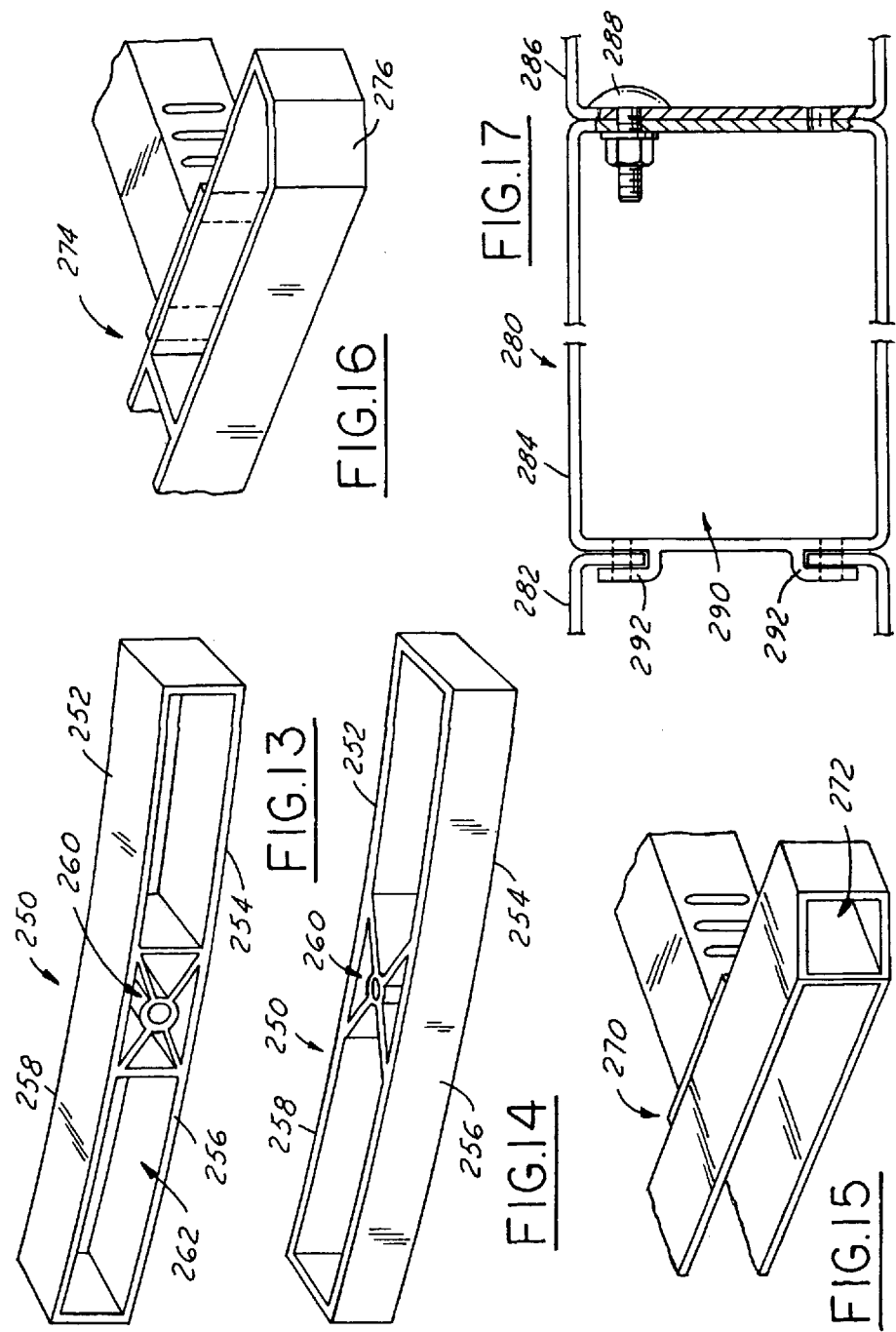

EXTRUDED ALUMINUM BUMPER

BACKGROUND OF INVENTION

The present invention relates generally to an aluminum extruded bumper, and, more particularly, to an ultra-light aluminum extruded bumper that allows more design flexibility.

Bumpers for vehicles, including automobiles are well known and serve a variety of functions. Extruded bumpers for vehicles are traditionally formed by extruding the bumper along the y-axis or in other words, the axis that extends along the length of the bumper. This typically provides a bumper with a constant cross-section and a closed front face. Additionally, the shelf depth between the top and bottom surfaces is typically constant as the distance is locked because of the extrusion process. Any reshaping of the bumper structure would require expensive operations, such as multiple material removal operations.

Bumpers that are extruded along the y-axis suffer from a variety of disadvantages in that because they are typically not open from the front and do not readily provide a cooling path through the bumper to components located behind the footprint of the bumper. Additionally, once these types of bumpers have been formed, they are not susceptible to the easy packaging of other components therein, as there is relatively little access to the bumper compartment because of the closed condition. Thus, any loading and/or removal of components for purposes of packaging occurs primarily through the open sides.

Thus, when a conventional extruded bumper beam is impacted or subjected to a force, such as from a high-speed impact, the entire beam deforms.

SUMMARY OF INVENTION

It is therefore an advantage of the present invention to provide an extruded bumper with an open through area to provide a cooling path.

It is another advantage of the present invention to provide an extruded bumper that allows for improved packaging of various components.

It is a further another advantage of the present invention to provide an extruded bumper that has a reduced weight and thus provides increased fuel economy.

It is yet another advantage of the present invention to provide an extruded bumper that can be asymmetrical in both the front and plan view.

In accordance with the above and other advantages of the present invention, an aluminum extruded bumper for a vehicle and a method for forming same is provided. The bumper has a top face, a bottom face generally opposing the top face, a front face; and a rear face generally opposing the front face. The top face, the bottom face, the front face, and the rear face generally define a bumper interior cavity. The bumper interior cavity has at least one partition located therein, which is aligned in a longitudinal plane defined by a vehicle rail.

These and other features and advantages of the present invention will become apparent from the following description of the invention, when viewed in accordance with the accompanying drawings and appended claims.

BRIEF DESCRIPTION OF DRAWINGS

FIG. 10 is a perspective view of yet another embodiment of an extruded bumper in accordance with the present invention;

FIG. 11 is an enlarged view of a portion of an extruded bumper illustrating a bulkhead that is intended to contact a vehicle rail in accordance with a preferred embodiment of the present invention;

FIG. 12 is an enlarged view of a portion of an extruded bumper illustrating another embodiment of a bulkhead in accordance with a preferred embodiment of the present invention;

FIG. 13 is a perspective view of another embodiment of an extruded bumper in accordance with the present invention;

FIG. 14 is a perspective view of another embodiment of an extruded bumper in accordance with the present invention;

FIG. 15 is an enlarged view of a portion of an extruded bumper illustrating styling modifications to the bumper in accordance with a preferred embodiment of the present invention;

FIG. 16 is an enlarged view of a portion of an extruded bumper illustrating styling modifications to the bumper in accordance with another preferred embodiment of the present invention;

FIG. 17 is a schematic illustration of a segmented extruded bumper with connections between the segments in accordance with a preferred embodiment of the present invention;

DETAILED DESCRIPTION

Referring now to the Figures, which illustrate various embodiments of an extruded bumper in accordance with the present invention. The disclosed bumper is preferably formed from an aluminum material. However, a variety of other materials can be utilized. Additionally, the disclosed bumper is preferably for use on vehicles, such as automobiles, however, it may be utilized in a variety of other applications. Further, the disclosed bumper may be employed on either the front or rear of the vehicle or on other known structures.

Figure 1:
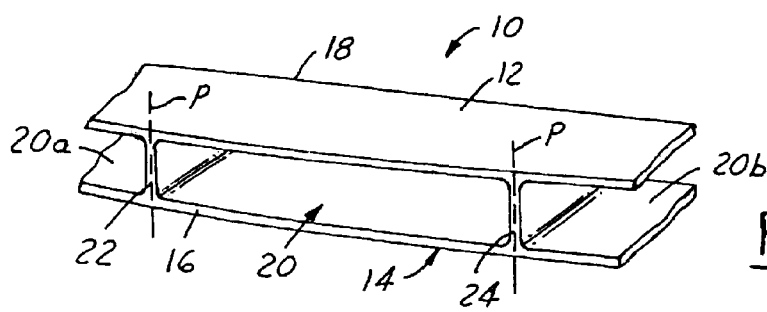
FIG. 1 is a perspective view of a portion of an extruded bumper in accordance with a preferred embodiment of the present invention.

FIG. 1, illustrates an extruded bumper 10 in accordance with the present invention. The bumper 10 has a top face 12, a bottom face 14, which generally opposes the top face 12, a front face 16, and a rear face 18, which generally opposes the front face 16. The rear face 18 is intended to abut or be aligned with the vehicle. The bumper 10, shown in FIG. 1, is preferably formed by extrusion along the x-axis such that an internal cavity 20 is formed within the bumper 10 and is defined by the inner surfaces of each of the top face 12, the bottom face 14, the front face 16, and the rear face 18. The bumper 10 also has a pair of partition members 22, 24 that are formed during the extrusion process. The partition members 22, 24 divide the internal cavity 20 into multiple cavities, such that outer cavities 20a and 20b are formed adjacent the outer portions of the partition members 22, 24.

Each of the pair of partition members 22, 24 extends between the top face 12 and the bottom face 14 and the front face 16 and the rear face 18. Each of the partition member 22, 24 is located in a plane P defined by a vehicle rail such that each of the partition members 22, 24 is aligned (i.e. force directed therealong) with a respective vehicle rail. The terms front and rear are used in connection with the description of the bumper, for purposes of illustration and are not intended to limit the bumper to a specific location (front or rear) on a vehicle or other structure.

The internal cavity 20 is open to the front face 16 and the rear face 18, such that air can flow therebetween. The open front face 16 permits a cooling path between the front face 16 and the rear face 18 along the entire length of the beam compartments 20, 20a, 20b without adversely jeopardizing sectional structural properties. This is because the partition members 22, 24 are aligned with the right-hand and left-hand rails of the vehicle, which allows the loading of the barrier through the rails. While three cavities are shown, the bumper may be divided into any number of cavities, which may disposed in a variety of locations.

Figure 2:
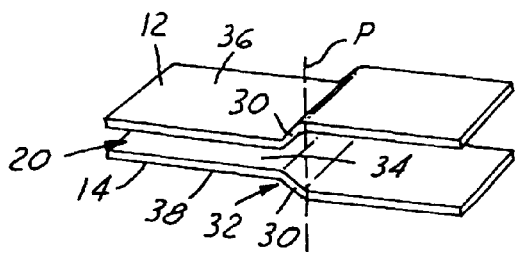
FIG. 2 is a perspective view of a portion of an extruded bumper in accordance with another preferred embodiment of the present invention.

FIG. 2 illustrates another embodiment of an extruded bumper 10. In this embodiment, the top face 12 and the bottom face 14 are formed so as to converge towards one another. The top face 12 and the bottom face 14 preferably converge through the formation of a curve or bend 30 in each face to form a partition 32. In this embodiment, the partition 32 does not extend entirely between the top face 12 and the bottom face 14 and leaves a gap 34 therebetween. The gap 34 between the bends 30 must be sufficient to maintain structural integrity of the bumper 10. The partition 32 preferably occurs at or about the vehicle rail, such that it lies in the same plane P as the rails.

The lowering of the top face 12 and the raising of the bottom face 14, through the inclusion of the bends 30, forms a recessed portion 36 in the top face 12, and a recessed portion 38 in the bottom face 14. The recessed portions 36, 38 form a cooling path that allows air to flow over, under and through the bumper 10.

Figure 3:
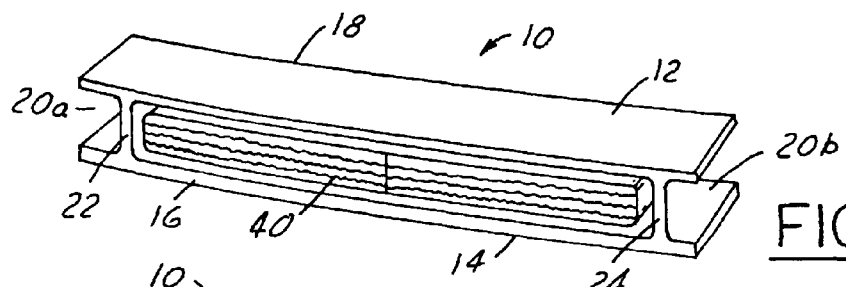
FIG. 3 is a perspective view of a portion of an extruded bumper illustrating some condenser packaging advantages in accordance with the present invention.

FIG. 3 illustrates how the bumper 10 of FIG. 1 can be utilized to assist in packaging of one or more vehicle accessories. As shown, a condenser 40 is preferably located in the internal cavity 20 between the pair of partitions 22, 24. By locating the condenser 40 in the bumper 10, the envelope size normally required in the engine compartment of the vehicle to store the condenser is decreased, which results in weight, space, and thus cost savings. While a condenser 40 is shown, it will be understood that a variety of other accessories can be packaged in the disclosed bumper 10, including, air zip tubes, mini-radiator condensers, and transmission or engine cooling tubes. Additionally, the location of any of these components in the internal cavity 20 of the bumper will assist in providing airflow to these structures, thereby increasing the efficiency of the vehicle.

Figure 4:
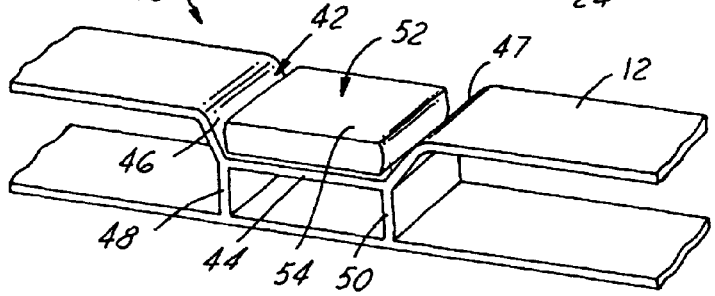
FIG. 4 is a perspective view of a portion of an extruded bumper illustrating some sensor packaging advantages in accordance with the present invention.

FIG. 4 illustrates another embodiment of an extruded tube 10 in accordance with the present invention. In this embodiment, the top face 12 has a recessed portion 42 formed therein. The recessed portion 42 is formed through the lowering a portion of the top face 12 to form a generally flat middle portion 44 in the top face 12. The lowering is preferably effectuated by including a pair of downward slanting surfaces 46, 47 in the top face 12. These surfaces 46, 47 preferably extend downward adjacent each of a pair of opposing partitions 48, 50. It should be understood that the downward slanting surfaces 46, 47, as well as the opposing partitions 48, 50 may be configured in a variety of different ways, including curved or vertical and may be located in a variety of different places along the bumper length.

The recessed portion 42 is preferably lowered to a spaced distance in order to accommodate a vehicle accessory thereon to improve the packaging of the bumper. As shown, a sensor 52 is preferably located in the recessed portion 42. The sensor 52 has an upper surface 54, which is located at or below the top face 12 of the bumper 10. While the bumper is shown preferably configured for a sensor, it should be understood that a variety of other accessories could be packaged in the bumper, including those set forth above.

Figure 5:
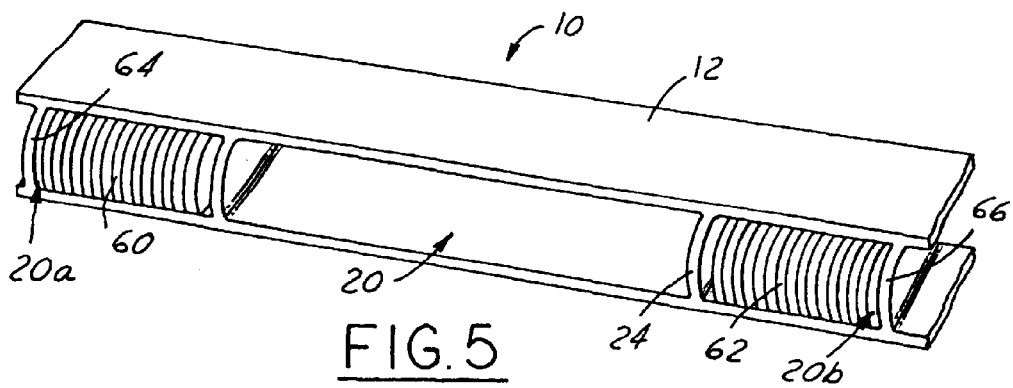
FIG. 5 is a perspective view of an extruded bumper illustrating some vehicle lamp packaging advantages in accordance with the present invention.

FIG. 5 illustrates the bumper 10 of FIG. 1 with a pair of lamps 60, 62 packaged in the interior cavity of the bumper 10. As shown, the lamps 60, 62 are located adjacent the outer portion of each of the partitions 22, 24 in the outer cavities 20a and 20b. Additionally, a pair of outer partitions 64, 66 bound the outer portion of each of the lamps 60, 62 to assist in properly locating the lamps 60, 62 therein. Again, by locating the lamps 60, 62 within the envelope or footprint of the bumper, significant packaging advantages can be received. Additionally, the vehicle can be made smaller to eliminate the space that would normally be required to accommodate the removed component, which can also result in decreased weight, reduced drag coefficient and thus increased fuel economy.

Figure 6:
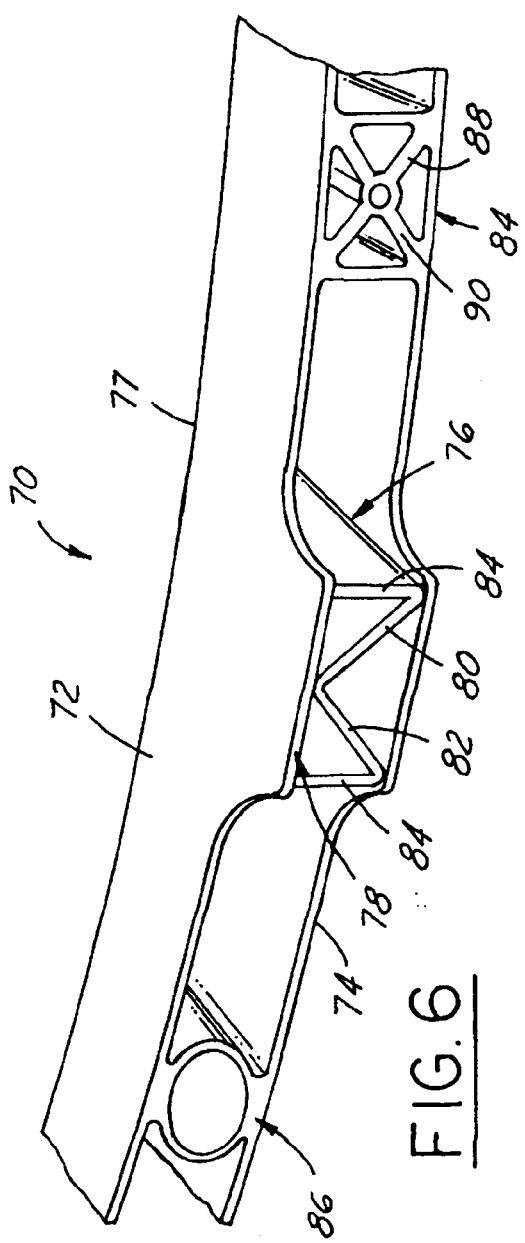
FIG. 6 is a perspective view of another embodiment of an extruded bumper in accordance with the present invention.

FIG. 6 illustrates a bumper 70 that has been extruded along the x-axis in accordance with the present invention. Additionally, the bumper 70 has been strategically tuned to provide local optimization. The bumper 70 has a top face 72, a bottom face 74 generally opposing the top face 72, a front face 76, and a rear face 77. The bumper 70 has been extruded and material has been removed so as to form an asymmetrical bumper beam. The front face 76 is asymmetrical in that it is not generally parallel thereacross and is not entirely parallel with respect to the rear face 77. It should be understood that the configuration of the front and rear faces may be reversed, such that the front face is flat while the rear face is asymmetrical.

The front face 76 has a middle portion 78 that has been locally extruded such that a stiffening member 80 is located in the middle portion 78. The stiffening member 80 has a middle portion 82 and a pair of generally vertical end portions 84. The middle portion 78 can be configured outwardly for styling reasons or alternatively to prevent a low or high speed impact from penalizing the entire bumper beam.

The bumper 70 also has a first stiffening member 86, and a second stiffening member 88. The first stiffening member 86 is located in the bumper 70 such that it is aligned with a first vehicle rail. Similarly, the second stiffening member 88 is located in the bumper such that it is aligned with a second vehicle rail. As shown, the first stiffening member 86 is generally square in shape with a pair of diagonal crosspieces 90. The second stiffening member 88 is generally circular in shape. Through the inclusion of the stiffening members 86, 88, any forces acting on the bumper 70 due to a collision are transferred from the stiffening members 86, 88 to the vehicle rails, instead of being dispersed across the entire bumper. This helps maintain the integrity of the frame of the vehicle to the maximum extent possible. The stiffening members can take on a variety of configurations.

Figure 7:
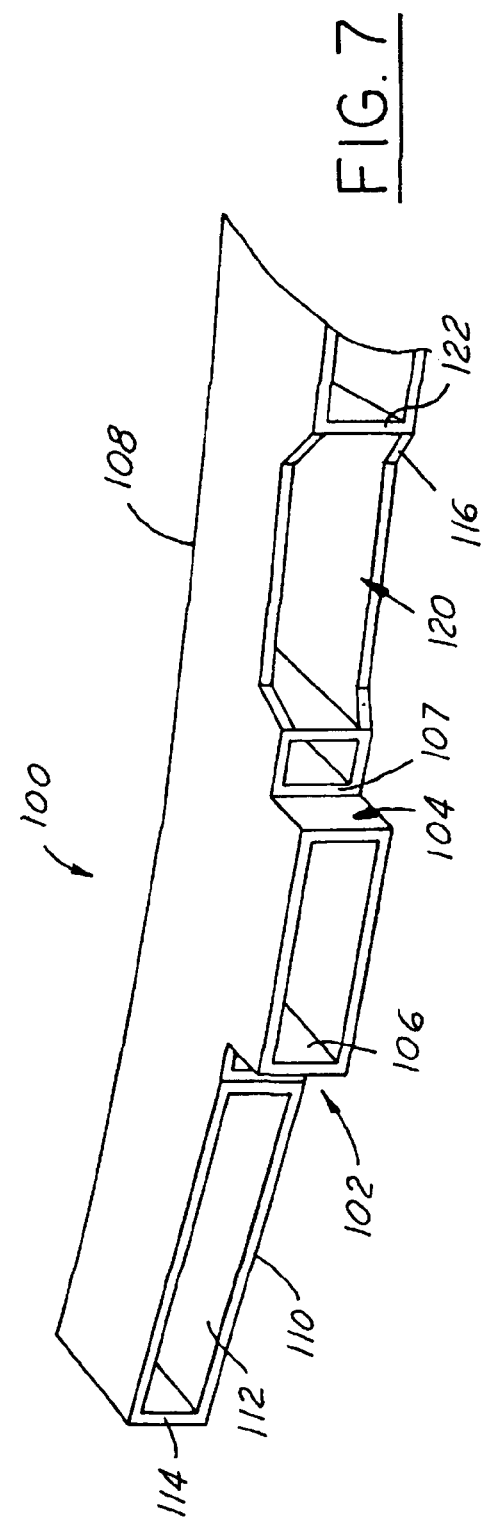
FIG. 7 is a perspective view of another embodiment of an extruded bumper in accordance with the present invention.

FIG. 7 also illustrates a bumper 100 that is extruded along the x-axis. As with the embodiment shown in FIG. 6, the bumper 100 has been strategically tuned to provide local optimization. The bumper 100 has a front face 102 that has been extruded and material removed such that the front face 102 is asymmetrical in that it is not generally parallel thereacross. The front face 102 has a peaked portion 104, which is generally located in the middle of the front face 102. Located on either side of the peaked portion 104 is a pair of generally vertically oriented partitions 106, 107. Each of the partitions 106 also extends generally between the front face 102 and a rear face 108.

As shown, the bumper 100 has a left-hand portion 110, which preferably includes an internal cavity 112. The internal cavity 112 is preferably located between one of the partitions 106 and a left-hand outer support 114. The right-hand portion 116 of the bumper 100 preferably has a recessed portion 120 located between the other of the partitions 107 and a right-hand outer support 122. The recessed portion 120 is intended to accommodate a license plate or vanity plate. It should be understood that the shape of the front face 102 of the bumper 100 can take on a variety of different shapes and configurations and is not limited to the illustrated configuration.

Figure 8A:
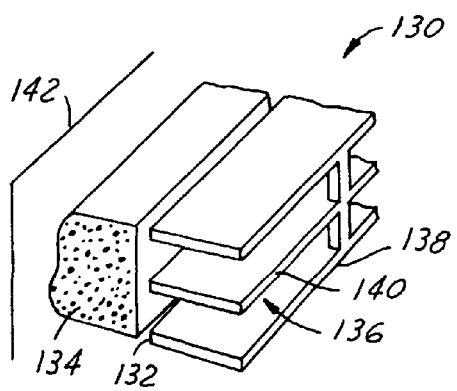
FIG. 8A is a perspective view illustrating an extruded bumper with an absorber positioned adjacent the bumper front face in accordance with a preferred embodiment of the present invention.
Figure 8B:
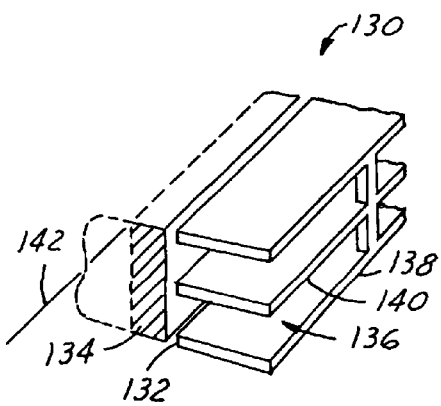
FIG. 8B is a perspective view of the extruded bumper of FIG. 8A illustrating partial compression of the absorber in accordance with a preferred embodiment of the present invention.
Figure 8C:
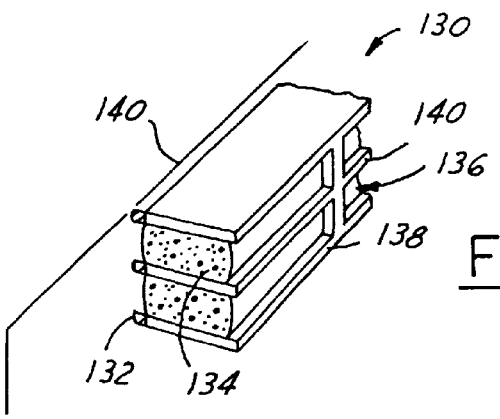
FIG. 8C is a perspective view of the extruded bumper of FIG. 8C illustrating full compression of the absorber in accordance with a preferred embodiment of the present invention.

Referring now to FIGS. 8a through 8c, which illustrate another embodiment of an extruded bumper 130 in accordance with the present invention. The bumper 130 is intended to provide pedestrian protection for low speed impacts and high-energy management concepts for protection at high-speed impacts. The bumper 130 has a front face 132 and is extruded along the x-axis. The front face 132 of the bumper 130 has an absorber 134 attached to or otherwise positioned to communicate with the bumper 130. It should be understood that the absorber 130 may be any energy dissipation device. The bumper 130 has an internal cavity 136 located between the front face 132 and a rear face 138. The internal cavity 136 preferably has a generally horizontal partition member 140 located therein to divide the internal cavity into multiple portions. The absorber 134 is preferably a soft energy absorber that can extrude through the interior cavities to dissipate energy in a two-stage compression/shear mode.

FIG. 8b illustrates how the bumper 130 reacts during impact. As shown, when a barrier line 142, which generally represents an object that is impacting the bumper 130, such as a pedestrian, a wall, or another vehicle, impacts the bumper 130, the absorber 134 is partially compressed. The amount of compression of the absorber 134 will depend upon the speed of impact. As will be understood, the absorber 134 acts to help dissipate some of the energy acting on the bumper 130 in the event of a collision.

FIG. 8c illustrates how the absorber 134 acts to dissipate energy in the event of an impact at a speed that is high enough to fully compress the absorber 134. As shown, in a fully compressed position, the absorber 134 is forced by the barrier line 142 into the internal cavity 136. The absorber 134 is preferably bisected or otherwise divided by the horizontal partition member 140 as the absorber 134 is forced into the bumper. This configuration helps dissipate forces that would otherwise be directly transmitted to a solid bumper or a bumper with a solid front face.

Figure 9:
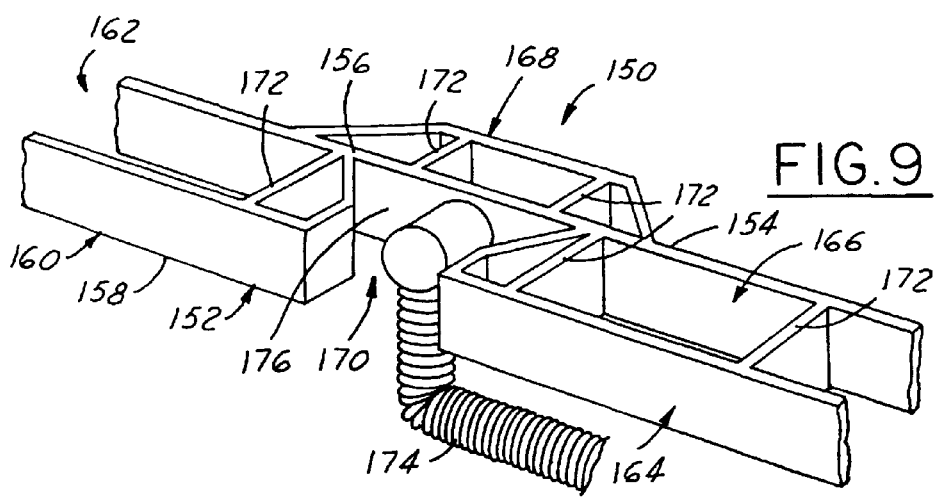
FIG. 9 is a perspective view of another embodiment of an extruded bumper in accordance with the present invention.

FIG. 9 illustrates a bumper 150 that is extruded along the z-axis. The bumper 150 has a front face 152, a rear face 154, a top face 156, and a bottom face 158. As shown, the bumper 150 has a left-hand portion 160, with a left hand internal cavity 162 formed therein. The bumper 150 also has a right hand portion 164 with a right hand internal cavity 166 formed therein. Any number of cavities may be included in the bumper. The bumper 150 has a rear center portion 168 that extends between and connects the left-hand portion 160 and the right hand portion 164. A recessed portion 170 is preferably formed between the left-hand portion 160 and the right hand portion 164 and forward of the rear center portion 168.

Each of the left hand portion 160, the right hand portion 164, and the rear center portion 168 preferably have at least one partition member 172 located therein. At least one of the partition members 172 in each of the portions 160, 162, 168 is preferably located in the portions such that any force applied to the front face 152 will be transferred to the vehicle rails. It will be understood that multiple partition members 172 may be included. Further, the recessed portion 170 can be utilized to assist in the packaging of various system accessories or components.

For example, as shown in FIG. 9, a cooling/zip tube 174 is connected to the front wall 176 of the rear center portion 168 with the connection being located in the recessed portion 170. This allows for significant space savings by utilizing the space in the bumper 150 for packaging of components. It should be understood that a variety of other components may be packaged in the recessed portion, either independently of or in connection with one another.

FIG. 10 illustrates a bumper 180 that is extruded along the z-axis. The bumper 180 has a front face 182, a rear face 184, a top face 186, and a bottom face 188. The bumper 180 has an internal cavity 190 that is separated into multiple cavities 190a, 190b, 190c by a pair of stiffening structures 192, 194. Each of the stiffening structures 192, 194 is preferably located in a plane P defined by the vehicle rail.

The first stiffening structure 192 has a front wall 195 that is recessed with respect to the front face 182 to form a recessed area 196 between the front wall 195 and the outer surface of the front face 182. The first stiffening structure 192 has a pair of generally vertical walls 198 located between the front wall 195 and the rear face 184. An article 200, such as a vehicle accessory, can be packaged or otherwise located in the recessed area 196. The configuration of the recessed area 196 allows the article 200 to be loaded and/or removed from the top, the bottom, or the front.

The second stiffening structure 194 has a rear wall 202 that is recessed with respect to the rear face 184 to form a recessed area 204 between the rear wall 202 and the outer surface of the rear face 184. The second stiffening structure 194 has a pair of generally vertical walls 206 located between the rear wall 202 and the front face 182. An article 208, such as a vehicle accessory, can be packaged or otherwise located in the recessed area 204. The configuration of the recessed area 204 allows the article 208 to be loaded and/or removed from the top, the bottom, or the rear. The articles 200, 208 can be any vehicle accessory, including those identified above.

FIG. 11 is an enlarged view of a portion of a bumper 210 that has been extruded along the x-axis. As shown, the bumper 210 has a top face 212 and a bottom face 214, generally opposing the top face 212. As with FIG. 2, the top face 212 and the bottom face 214 are formed so as to converge towards one another. The top face 212 and the bottom face 214 preferably converge through the formation of a curve or bend 216 in each face to form a partition 218. The partition 218 in this embodiment does not extend entirely between the top face 212 and the bottom face 214 and thus a gap 220 is formed therebetween. The gap 220 between the bends 216 is preferably sized so as to maintain structural integrity of the bumper.

The bumper 210 has a bulkhead 224 located in an internal cavity 226 defined between the top face 212, the bottom face 214, an open front face 228 and an open rear face 230. The bulkhead 224 lies in the same plane as the vehicle rail 222 and is preferably integrally formed with the bumper 210. The shape of the bulkhead 224 in FIG. 11 is merely exemplary, as the configuration of the bulkhead is not critical so long as it performs the requisite strengthening function. The reduced cross-section of the bumper 210 at its centerline assists in providing a cooling path, as is discussed above.

The bumper 210 as with the other x-axis extruded bumpers disclosed and described herein can be designed to match the height of the vehicle rail 222. In other words, the top face 212 and the bottom face 214 can be designed so that they lie parallel with the top and bottom surfaces of the vehicle rail 222. Alternatively, the height of the bumper 210 can be minimized to promote cooling. The disclosed bumper 210 is advantageous in that is provides for high-speed energy management, and prevents the bumper from rotating over or under the rail during a high-speed event.

Referring now to FIG. 12, which illustrates a z-axis extruded bumper 230. The bumper 230 has a generally open top face 232 and a generally open bottom face 234, generally opposing the top face 232. The bumper 230 also had a front face 235 and a rear face 236. The bumper 230 has a pair of localized corrugated ribs 238, 240 located in an internal cavity 242. The ribs 238, 240 extend between the front face 234 and the rear face 236. The ribs 238, 240 lie in the same plane P as the vehicle rail 244. The shape of the ribs 238, 240 is not critical and is merely exemplary. The ribs 238, 240 assist in controlling high speed and low speed impact events. The ribs 238, 240 may take on a variety of other configurations. Additionally, a variety of other support structures or bulkheads may alternatively be employed. It will be understood that by utilizing bumpers of designs that are extruded along the x and z-axis, a multitude of design options and design freedom now exists.

FIGS. 13 and 14 illustrate extruded bumpers 250 with the bumper in FIG. 13 being extruded along the x-axis while the bumper in FIG. 14 is extruded along the z-axis. Each of the bumpers 250 has a top face 252, a bottom face 254, a front face 256, and a rear face 258. The bumpers 250 each have an integrated bulkhead 260 located in the center of the internal cavity 262 to provide stiffness to the bumper 250 for center air bag sensor firing. While the integrated bulkheads 260 are located in the center of each bumper 250, it will be appreciated that the bulkheads 260 may additionally or alternatively be located at the vehicle rails to provide stiffness for high energy management.

It is also known that conventional y-axis extruded bumpers may require costly and forming processes for stylization, impact performance, and other purposes. These processes can involve two additional steps after extrusion. For example, to form a bumper having an end with a 30-degree corner, a slitting, a forming, and possibly a welding operation must be performed after extrusion.

As shown in FIG. 15, in accordance with the present invention, to form a 30-degree corner end with a z-axis extruded bumper, only a single material removal operation is required. First, a bumper 270 is formed through extrusion along the x-axis, as discussed above. Thereafter, one material removal operation is performed to form the corner, as generally indicated by reference number 272. Similarly, as shown in FIG. 16, no additional operations need to be performed; the bumper 274 is merely extruded along the z-axis with the flat corner 276 already formed.

Referring now to FIG. 17, it will be understood that the disclosed bumper could be formed through extrusion of multiple pieces or portions. Such a modular process could provide significant cost benefits, as will be understood by one of skill in the art. As shown in FIG. 17, the extruded bumper 280 includes a first portion 282, a second portion 284, and a third portion 286. Each of the portions 282, 284, 286 is preferably extruded separately. The portions 282, 284, 286 are then preferably secured to one another by an attachment mechanism 288 in order to form a single bumper structure. The attachment mechanism 288 is preferably located in the interior cavity 290 of the bumper 280. The illustrated attachment mechanism 288 is a nut and bolt. However, the illustrated attachment mechanism 288 is for illustration purposes only, however any known attachment mechanism may be utilized. Additionally, an interlock method of attachment 292 may also be utilized.

Figure 18:
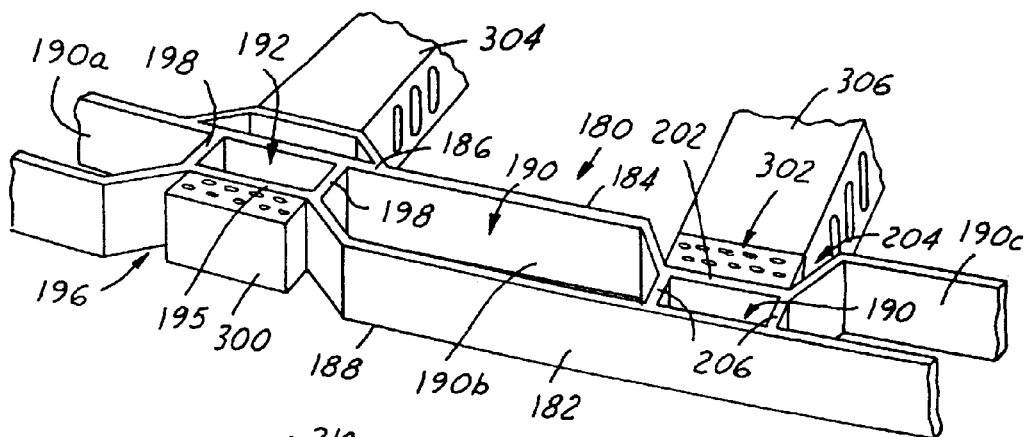
FIG. 18 is a perspective view of the extruded bumper of FIG. 10 with a pair of absorbers positioned therein in accordance with the present invention.

FIG. 18 illustrates the bumper 180 of FIG. 10, which is extruded along the z-axis. The articles 200, 208 from FIG. 10 are instead replaced with a respective absorber 300, 302. The absorbers 300, 302 are preferably located in the respective recessed areas 196, 204. The absorbers 300, 302 are also aligned with a respective vehicle rail 304, 306. The absorbers 300, 302 can be any known absorber, including aluminum honeycomb, foam, plastic egg crate, or other known absorbing structures.

Figure 19:
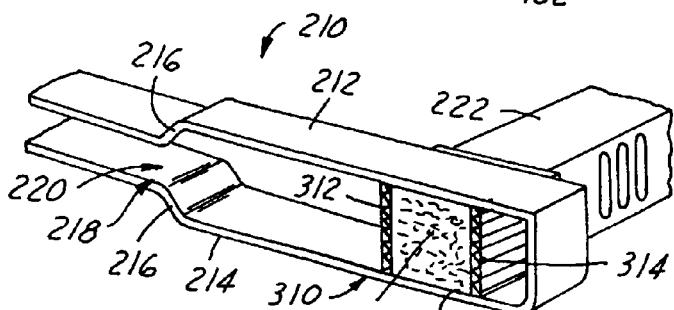
FIG. 19 is a perspective view of a portion of an extruded bumper with an absorber positioned in the bulkhead in accordance with the present invention.
Figure 20:
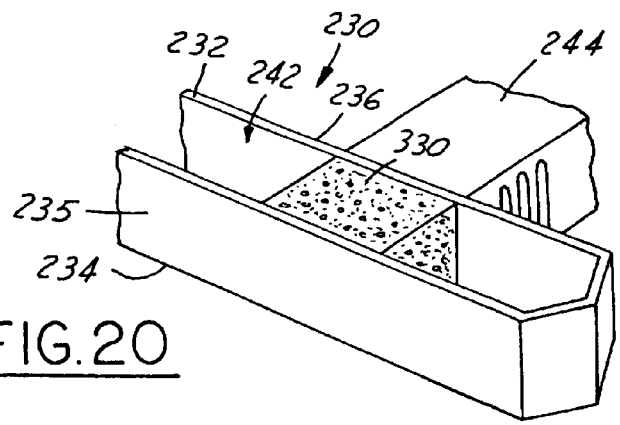
FIG. 20 is a perspective view of the portion of the extruded bumper of FIG. 12 with an absorber positioned in the bulkhead in accordance with the present invention.

FIG. 19 illustrates a portion of the bumper 210 of FIG. 11 that has been extruded along the x-axis in accordance with another embodiment. The bulkhead 224 from FIG. 11 has a different configuration. The bulkhead 310 shown in FIG. 19 includes a pair of opposing vertical portions 312, 314. The vertical portions 312, 314 define a cavity 316 therebetween in which an absorber 318 is preferably located. As discussed above, the absorber 318 can be any known absorber, including aluminum honeycomb, foam, plastic egg crate, or other known absorbing structures. Alternatively, the absorber 318 can entirely replace the bulkhead. In either configuration, the absorber 318 is preferably aligned with the vehicle rail 222.

The bumper 70 also has a first stiffening member 86, and a second stiffening member 88. The first stiffening member 86 is located in the bumper 70 such that it is aligned with a first vehicle rail. Similarly, the second stiffening member 88 is located in the bumper such that it is aligned with a second vehicle rail. As shown, the second stiffening member 88 is generally square in shape with a pair of diagonal crosspieces 90. The first stiffening member 86 is generally circular in shape. Through the inclusion of the stiffening members 86, 88, any forces acting on the bumper 70 due to a collision are transferred from the stiffening members 86, 88 to the vehicle rails, instead of being dispersed across the entire bumper. This helps maintain the integrity of the frame of the vehicle to the maximum extent possible. The stiffening members can take on a variety of configurations.

Figure 21:
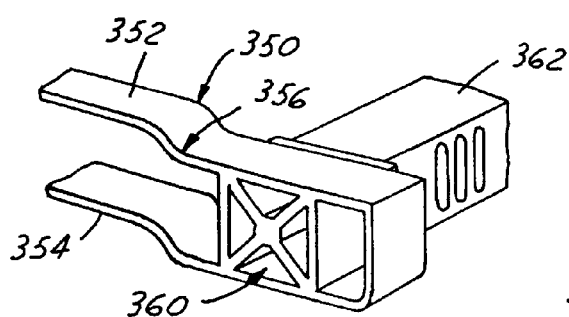
FIG. 21 is a perspective view of a portion of an extruded bumper in accordance with another embodiment of the present invention.

FIG. 21 illustrates another embodiment of the bumper 350 that has been extruded along the x-axis. The bumper 350 has a top face 352 and a bottom face 354, generally opposing the top face 352. The top face 352 and the bottom face 354 each have a bend 356 formed therein such that the top face 352 and the bottom face 354 do not lie in the same plane across their respective lengths. In other words, the bottom face 354 lies above the centerline C of the bumper 350. It should be understood that the bumper 350 can be configured with a bend that positions both the top face 352 and the bottom face 359 below the centerline. The bend 356 preferably lies inward of the bulkhead 360, which in turn is aligned with (lies in the same plane) the vehicle rail 362.

The configuration of the bumper allows for different packaging of vehicle accessories or components for both the front and rear bumpers. For example, with respect to the front bumper, a variety of components could be packaged of the bumper envelope, including energy absorber bosses, fog lamps, cornering lamps, parking lamps, vision systems, horns, tow hooks, tow recovery hooks, and sensors (FIG. 4). Similarly, with respect to the rear bumper, a variety of components could be packaged, including parking aid sensors, rear fog lamps, backup lamps, vision systems, license plate lamps, hitch plates, tow hooks, recovery hooks, and tire lowering cables.

The configuration of the disclosed embodiments permits installation and removal of components from the front, rear, top and/or bottom. The disclosed configuration also permits one to gain access to other components through the bumper for service, installation, vehicle build or any other reason. Additionally, the disclosed bumper can be extruded or otherwise configured asymmetrically in the front and plan views.

Having now fully described the invention, it will be apparent to one of ordinary skill in the art that many changes and modifications can be made thereto without departing from the spirit or scope of the invention as set forth herein.

What is claimed is:

1. An extruded bumper for a vehicle comprising:
    a substantially open front face;
    a top face;
    a bottom face;
    a substantially open rear face;
    at least one cavity located between said substantially open front face and said substantially open rear face; and
    at least one generally vertical partition extending between said top face and said bottom face, said at least one generally vertical partition located in a plane defined by at least one vehicle rail.

2. The bumper of claim 1, wherein the bumper is comprised of an aluminum material.

3. The bumper of claim 1, wherein said top face is generally parallel to said bottom face.

4. The bumper of claim 1, further comprising:
    a pair of generally vertical partitions each located in a plane defined by a respective vehicle rail.

5. The bumper of claim 4, further comprising a condenser located in said cavity between said pair of generally vertical partitions.

6. The bumper of claim 4, farther comprising a pair of lamps each located between said top face and said bottom face and adjacent an outer surface of a respective one of said pair of partitions.

7. An extruded bumper for a vehicle comprising:
    a top face;
    a bottom face generally opposing said top face;
    front face disposed forward of the vehicle;
    rear face generally opposing said front face; and
    a bumper interior cavity generally bounded by said top face, said bottom face, said front face, and said rear face; and
    at least one partition located in said bumper interior and aligned in a generally vertical longitudinal plane, said at least one partition extending from said front face to said rear face;
    whereby the bumper is constructed from a metal material.

8. The original bumper of claim 7, wherein the bumper is extruded along an x-axis such that said front face and said rear face are substantially open to form a cooling path though said interior cavity.

9. The bumper of claim 7, wherein said at least one partition extends generally between said top face and said bottom face.

10. The bumper of claim 7, wherein one of said top face and said front face is formed to accommodate at least one vehicle accessory to assist in vehicle packaging.

11. The system of claim 7, wherein said bumper interior cavity is formed to accommodate at least one vehicle accessory to assist in vehicle packaging.

12. An extruded bumper for attachment to a vehicle, the bumper comprising:
    an interior cavity defined by a front face, a rear face, a top face, and a bottom face;
    at least one support structure disposed in said interior cavity and in alignment with a generally vertical plane, said at least one support structure extending from said front face to said rear face;
    wherein the bumper is constructed of a metal material;
    wherein said front face is forward of the vehicle and said rear face is rearward of said front face.

13. The bumper of claim 12, wherein the bumper is attached to the front of a vehicle.

14. The bumper of claim 12, wherein the bumper is extruded along an x-axis such that at least one of said front face or said rear face is substantially open.

* * * * *